United States Patent [19]
Watanabe et al.

[11] Patent Number: 5,776,539
[45] Date of Patent: Jul. 7, 1998

[54] PROCESS OF PREPARING CARBON SUPPORT COATED WITH POLYOLEFIN AND OF PREPARING GAS DIFFUSION ELECTRODE EMPLOYING SAID CARBON SUPPORT

[75] Inventors: Masahiro Watanabe, No. 2421-8, Wadamachi, Kofu-shi, Yamanashi; Noriaki Hara, Kanagawa, both of Japan

[73] Assignees: Tanaka Kikinzoku Kogyo K.K.; Masahiro Watanabe, both of Japan

[21] Appl. No.: 570,784

[22] Filed: Dec. 12, 1995

[51] Int. Cl.⁶ .................................................. B05N 5/12
[52] U.S. Cl. .................. 427/113; 427/331; 427/374.1; 427/385.5; 427/398.4; 427/421
[58] Field of Search .................. 427/115, 374.2, 427/385.5, 421, 113, 331, 374.1, 398.4

[56] References Cited

U.S. PATENT DOCUMENTS

| | | | |
|---|---|---|---|
| 3,617,351 | 11/1971 | Lang et al. | 117/75 |
| 4,216,283 | 8/1980 | Cooper et al. | 430/126 |
| 4,345,004 | 8/1982 | Miyata et al. | 428/416 |
| 4,543,269 | 9/1985 | Kiritani et al. | 427/44 |
| 4,590,142 | 5/1986 | Yamazaki et al. | 430/138 |
| 4,861,644 | 8/1989 | Young et al. | 428/195 |
| 5,093,201 | 3/1992 | Ohtani et al. | 428/407 |
| 5,137,754 | 8/1992 | Watanabe | 427/221 |
| 5,330,874 | 7/1994 | Mahabadi et al. | 430/137 |

*Primary Examiner*—Benjamin Utech
*Attorney, Agent, or Firm*—Klauber & Jackson

[57] ABSTRACT

Disclosed herein are process of preparing carbon supports coated with polyolefin or fluorinated polyolefin to be employed as a network substrate of such an electrochemical cell, in these processes, a solvent which solvates the polyolefin is employed for forming polyolefin in the shape of nearly single fibers which are the smallest unit conceivable. The carbon supports coated with the said solvated polyolefin which possesses the maximum uniformity concalvable have the maximum performance when they are employed in a gas diffusion electrode.

15 Claims, 3 Drawing Sheets

PROCESS OF PREPARING CARBON SUPPORT COATED WITH POLYOLEFIN AND OF PREPARING GAS DIFFUSION ELECTRODE EMPLOYING SAID CARBON SUPPORT

BACKGROUND OF THE INVENTION

The present invention relates to a process of preparing carbon supports coated with polyolefin useful as an intermediate of carbon supports coated with fluorinated polyolefin to be employed as a network substrate of such an electrochemical cell as a phosphoric acid fuel cell, to processes of preparing carbon supports coated with fluorinated polyolefin and of preparing a gas diffusion electrode employing the carbon supports coated with polyolefin, and more particularly to processes of preparing the said carbon supports and the like which enable the more uniform formation of the polyolefin.

A gas diffusion layer of the electrochemical cell such as the above fuel cell containing a catalyst layer and the gas diffusion layer being in contact with the catalyst layer is prepared, for example, by applying or contact-bonding a mixture of catalyzed carbon black or the like and hydrophobic polytetrafluoroethylene (hereinafter referred to as "PTFE") powder or by adhering the PTFE on carbon paper followed by sintering.

However, a large amount of the PTFE is required in the gas diffusion layer in order to maintain the gas supplying function over a long period of time so that fine apertures among the carbon black particles are blocked with the PTFE resulting in the lowering of the gas supplying function. Accordingly, when the gas diffusion layer is employed in the electrochemical cell, the reduction of the function may be invited.

On the other hand, the catalyst layer functions as gas passages and electrolyte passages, and a reaction gas supplied from the gas diffusion layer diffuses in the gas passages in the catalyst layer to be dissolved in an electrolyte in contact therewith so that an electrode reaction is carried out on the catalyst in the electrolyte.

However, the gas supplying function of the catalyst layer is lowered due to the penetration of the electrolyte into the gas passages after the operation of a long period of time so that the considerable decrease of the call functions may also invited. The increase of the PTFE for preventing this decrease of the functions makes the electrolyte impermeable into the catalyst layer so that the catalyst cannot participate in the reaction also resulting in the decrease of the cell functions.

The present Applicants have proposed a process of coating a carbon black (CB) coated with a fluorinated polymer compound thin layer which comprises impregnating the said support with dispersion of such a polymer compound as polyethylene (PE) for loading the compound on the surface of the support and fluorinating the polymer compound (U.S. Pat. No. 5,137,754).

Although this process is excellent in the production of the carbon support hydrophobically treated, the preparation of the completely uniform dispersion by dissolving the polymer compound is relatively difficult. Since, further, the PE particles in the dispersion cannot be divided so finely, the coating on the surface of the PE/CB is disadvantageously made to be ununiform. If the fluorinated polymer compound layer produced on the support can be more uniformly, an electrochemical cell having further activities may be produced.

The present Applicants have also proposed a process of coating CB with a fluorinated polymer compound which comprises uniformly mixing PE particles and CB particles followed by thermal treatment for fusing the PE which is then dispersed on the surface of the support and fluorinated the dispersed PE (Japanese patent application No.5-80228). However, in this process, the PE particles and the support are in point contact with each other, and even if the fused PE spreads over the support by means of the thermal fusion, the completely uniform dispersion cannot be achieved. Depending on the conditions, part of the support surface is not covered or the unevenness may be formed.

SUMMARY OF THE INVENTION

In view of the above drawbacks, an object of the present invention is to provide a process of more uniformly forming a polyolefin coating of carbon supports coated with the polyolefin which may be a precursor of carbon supports coated with fluorinated polyolefin.

Another object of the present invention is to provide a process of preparing the carbon supports coated with fluorinated polyolefin through the carbon supports coated with the polyolefin.

A further object of the present invention is to provide a process of preparing a gas diffusion electrode employing the said carbon supports coated with the fluorinated polyolefin.

A first aspect of the present invention is a process of preparing carbon supports coated with polyolefin which comprises mixing the polyolefin and the carbon supports in a solvent which may solvate the polyolefin at a temperature higher than the melting point of the polyolefin, loading the polyolefin in a finely divided state on the carbon supports by rapid cooling and making a thin layer by fusing the polyolefin.

The polyolefin precipitated by means of the solvation and the rapid cooling is the smallest unit conceivable and the polyolefin having a smaller diameter cannot actually exist. Accordingly, the number of sites of contact points between the polyolefin solvated and loaded on the carbon support is nearly the maximum value so that the contact efficiency between the polyolefin on the carbon support coated with the said polyolefin and the said carbon support produced by fusing the said polyolefin is nearly maximum and the polyolefin exists on the carbon support in the maximum degree of dispersion.

The polyolefin loaded on the carbon support prepared in accordance with the process of the present invention possesses the nearly maximum uniformity conceivable and, of course, this level has not been reached in the prior art.

A second aspect of the present invention is a process of preparing carbon supports coated with fluorinated polyolefin which comprises mixing the polyolefin and the carbon supports in a solvent which may solvate the polyolefin at a temperature higher than a melting point of the polyolefin, loading the polyolefin in a finely divided state on the carbon supports by rapid cooling, making a thin layer by fusing the polyolefin and fluorinating the carbon supports in a fluorine gas atmosphere for converting the polyolefin into the fluorinated polyolefin.

This aspect comprises the fluorination of the carbon supports coated with polyolefin prepared by the first aspect of the present invention. Since the uniformity of the polyolefin prepared by the first aspect is nearly maximum, that of the fluorinated polyolefin prepared in accordance with the second aspect is also nearly maximum conceivable.

A third aspect of the present invention is a process of preparing a gas diffusion electrode which comprises mixing polyolefin and carbon supports in a solvent which may solvate the polyolefin at a temperature higher than the melting point of the polyolefin, loading the polyolefin in a finely divided state on the carbon supports by rapid cooling, making a thin layer by fusing the polyolefin, fluorinating the carbon supports in a fluorine gas atmosphere for converting the polyolefin into the fluorinated polyolefin and constituting the gas diffusion electrode employing the carbon supports coated with the fluorinated polyolefin as a constituent of a catalyst layer and/or a gas diffusion layer.

The carbon supports coated with the polyolefin or with the fluorinated polyolefin of the second and the third aspects, respectively, are eventually and frequently employed as gas network material which are constituents of the catalyst layer and/or the gas diffusion layer of the gas diffusion electrode of such an electrochemical cell as a fuel cell. Since the fluorinated polyolefin coating the catalyst particles of the gas diffusion electrode possesses the nearly maximum uniformity, the said gas diffusion electrode can obtain the highest hydrophobicity, the longest life and the maximum gas diffusability based on the hydrophobicity.

Fourth, fifth and sixth aspects of the present invention which include spray-drying of the mixture containing the polyolefin and the carbon supports are the improvements of the first, second and third aspects of the present invention, respectively. According to these aspects, the still higher uniformity of the polyolefin and the fluorinated polyolefin can be obtained.

Although the solvent may be removed by means of the thermal drying in the first, second and the third aspects of the present invention, a small degree of the agglomeration and the growth of the particles may be observed. On the other hand, neither agglomeration nor the growth of the particles occurs in the fourth, fifth and sixth aspects of the present invention so that the maximum uniformity conceivable can be obtained.

DETAILED DESCRIPTION OF INVENTION

Figure 1:
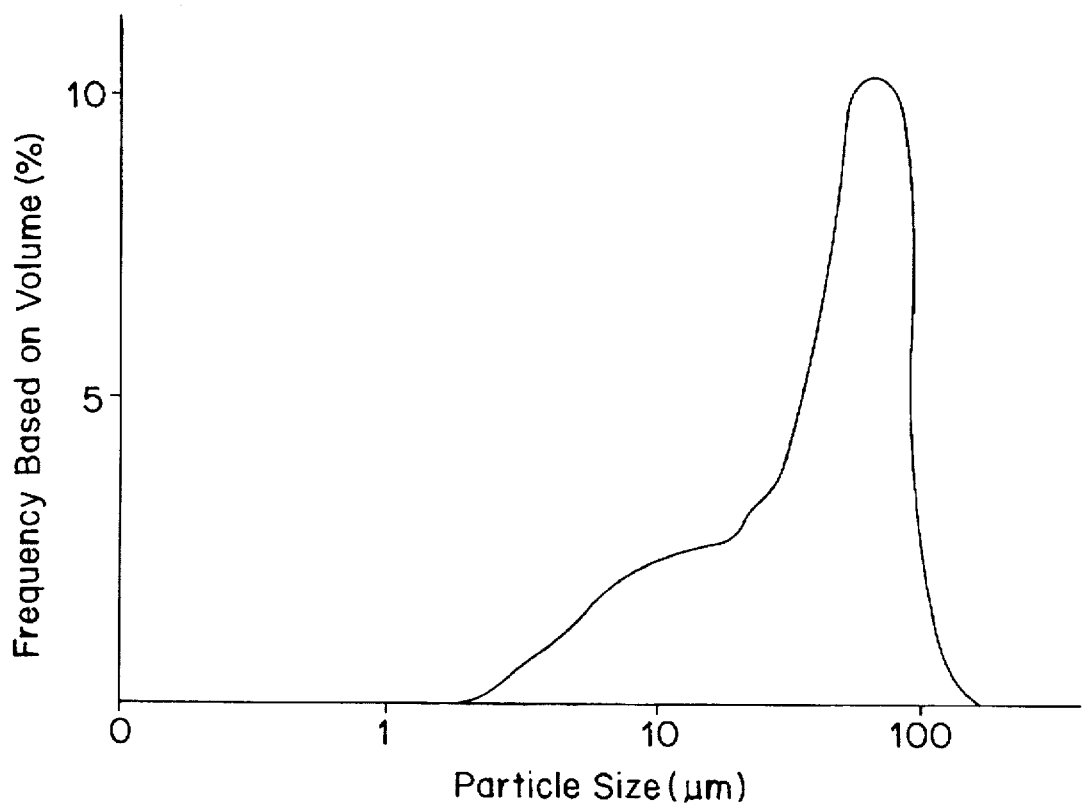
FIG. 1 is a graph showing the particle distribution of the carbon support coated with the polyolefin obtained in Example 1.

In order to prevent the depression of the uniformity due to the small number of the contact points between the carbon support and the polyolefin in the above prior art, the polyolefin particles at the initial contact stage is made to be as small as possible to increase the number of the contact points as large as possible in the present invention so that the eventual distribution of the polyolefin is forced to be more uniform and film-like. In addition, even the polyolefin has relatively smaller melt viscosity than PTFE, It is quite difficult to form a thin film from large particles. Accordingly, relatively smaller clusters are needed in order to obtain more uniform PE/CB.

In the present invention, the polyolefin is solvated in a solvent for obtaining the fineness of the polyolefin. The polyolefin, especially polyethylene, in the state of complete solvation exists in the solvent in the shape of a nearly single fiber and the state of the nearly single fiber is actually deemed to be the smallest unit of the polyolefin existable. When, accordingly, the polyolefin is precipitated on the carbon support maintaining this state, the carbon support coated with the polyolefin which is dispersed most finely and uniformly can be produced. Because of the fineness of the precipitated polyolefin, it is easily fused and made to be film-like by means of slight thermal treatment over the melting point of the polyolefin.

When the said carbon support coated with the polyolefin suspended in the solvent is filtered and dried to obtain the desired carbon support in a separated and dried state, the polyolefin may partially agglomerate. Even this partially agglomerating polyolefin possesses much more uniformity than that of the prior art carbon black through this solvent separation treatment in addition to the above slight thermal treatment may invite the agglomeration and the growth of the carbon supports because the polyolefin single fibers are intertwined with one another. In the succeeding steps such as a pulverization step, the particle size is scattered and the uniform carbon support particles are not easily obtained.

Accordingly, in the present invention, the above thermal treatment and/or the solvent separation treatment can be replaced with the spray-drying which does not accompany the agglomeration and the growth of the carbon supports.

The spray-drying can be conducted by spraying particles suspended in a solvent through a fine diameter portion such as a nozzle at a relatively high speed for evaporating the solvent. According to this spray-drying, the uniform and fine carbon support coated with the polyethylene without the agglomeration and the particle growth can be obtained.

The spaying may be conducted by employing such an inert gas as a nitrogen gas, that is, the organic solvent suspension of the carbon supports coated with the polyolefin is forced to pass through a small diameter path such as a nozzle at a relatively high speed wherein the organic solvent passes as fine liquid drops because the nozzle diameter is small. Accordingly, the carbon supports pass not in the agglomeration state but as relatively small clusters. The amount of the organic solvent constituting the respective accompanying liquid drops is small so that the solvent easily evaporates by being sprayed through the nozzle and is removed without a special drying treatment, and the agglomeration of the carbon supports seldom occurs. The agglomeration also seldom occurs if additional slight thermal treatment is carried out.

The diameter of the nozzle is made to be around 0.1 to 2 mm and a pressure is applied such that the suspension passes through the nozzle at a rate around 1 to 10 g/minute, preferably between 0.5 and 1.5 kg/cm$^2$. The preparation procedure and the drying procedure can be simultaneously conducted without a special drying procedure by making the nozzle inlet temperature to be a relatively high temperature, for example, between 60° and 160° C. and by evaporating the organic solvent by means of scattering the organic suspension through the nozzle to an ordinary temperature atmosphere or to an inert gas atmosphere such as nitrogen, that is, by simply passing the solvent through the nozzle. The particle size of the particles thus obtained is desirably between 1 and 50 μm.

The carbon support usable in the present invention includes carbon black, active carbon, amorphous carbon and the like, and the carbon black is desirably employed.

The polyolefin usable in the present invention includes polyethylene and polypropyrene which have a relatively small molecular weight and do not lose the fluidity, and the polyethylene is desirably employed.

Although the appropriate solvent which solvates the polyolefin is different depending on the kind of the polyolefin, n-hexane, n-pentane, n-heptane, dioxane and chloroform may be employed in case of the polyethylene. The polyolefin is nearly completely solvated by putting the polyolefin such as the polyethylene into the solvent and thermally treating the polyolefin under a high temperature over the melting point of the polyolefin and a high pressure for depressing the boiling of the solvent (ordinarily between 3.5 and 30 kg/cm² depending on the kind of the solvent). The thermal treating temperature must be maintained under the critical temperature of the solvent and, in case of the polyethylene, the thermal treatment is conducted between 110° C., its melting point, and 235° C., its critical temperature.

When the mixed solution or suspension of the solvated polyolefin and the carbon supports is rapidly cooled by means of water cooling, putting into a condenser or the like, the solvated polyolefin is precipitated on the adjacent carbon support maintaining the finely dispersed state. Thereafter, the polyolefin is made to be film-like by means of the thermal treatment or the spray-drying of the carbon supports coated with the polyolefin. Since as mentioned the solvated polyolefin is the smallest unit existable, the solvated polyolefin precipitated on the carbon supports is also the smallest unit existable so as to provide the maximum contact points so that the polyolefin film produced by diffusing the fused and/or spray-dried polyolefin on the carbon supports possesses the maximum uniformity.

The carbon support coated with the polyolefin thus prepared may be converted into the carbon support coated with the fluorinated polyolefin by means of fluorination. The conversion may be conducted in accordance with prior art and, for example, the fluorination proceeds by simply placing the carbon support coated with the polyolefin in a fluorine gas atmosphere diluted with an inert gas. Of course, the reaction rate may be elevated by means of slight heating.

As mentioned, the fluorinated polyolefin film of the carbon support thus prepared possesses the maximum coating uniformity similarly to that of the carbon support coated with the polyolefin. When, accordingly, the carbon support coated with the fluorinated polyolefin is employed as gas network material of the catalyst layer and/or the gas diffusion layer of the gas diffusion electrode of an electrochemical cell such as a fuel cell, the gas network material is uniformly distributed in the catalyst layer and/or the gas diffusion layer so that a long life of the gas diffusion electrode can be secured without the deterioration of the catalyst performance due to the permeation of an electrolyte even if the operation is conducted for a long period of time.

EXAMPLES

Although Examples of processes of preparing carbon supports coated with polyolefin or fluorinated polyolefin and a gas diffusion electrode employing the carbon supports will be described, these Examples are not construed to restrict the present invention.

EXAMPLE 1

After carbon black (Denka Black) and polyethylene (pellet-like sample of VitZex 2021L, Mitsui Petrochemical Industries, Ltd.) were weighed in the weight ratio of 68:32 and mixed, the mixture was poured into n-hexane for forming slurry.

After this was stirred for 10 hours at high temperature, and high pressure conditions of 170° C. and 11 kg/cm² for sufficiently solvating the polyethylene, the slurry was rapidly cooled by water cooling, filtered and dried. The carbon black carrying the polyethylene was pulverized and thermally treated for one hour at 190° C. in a rotary kiln having a nitrogen atmosphere to prepare the carbon black coated with the polyethylene.

The surface areas which were neutralized by unit carbon black weight of the carbon black at the time of carrying the polyethylene (before the thermal treatment) and of the carbon black after the thermal treatment were 74 m²/g, 34 m²/g and 28 m²/g, respectively. The decrease rates of the neutralized surface areas of the carbon black before and after the thermal treatment to that of the initial carbon black were −54% and −62%, respectively. The particle distribution thereof is shown in FIG. 1. The axis of abscissa is a logarithm scale.

COMPARATIVE EXAMPLE 1

The carbon black and the polyethylene the same as those of Example 1 were weighed in the weight ratio of 68:32. After the pulverized carbon black was added to n-hexane dispersion of polyethylene and sufficiently mixed, the solvent was evaporated. These particles were pulverized and thermally treated for five hours at 210° C. in a rotary kiln having a nitrogen atmosphere to prepare the carbon black coated with the polyethylene.

The neutralized surface areas of the initial carbon black, of the carbon black at the time of carrying the polyethylene (before the thermal treatment) and of the carbon black after the thermal treatment were 74 m²/g, 44 m²/g and 41 m²/g, respectively. The decrease rates of the neutralized surface areas of the carbon black before and after the thermal treatment to that of the initial carbon black were −40% and −45%, respectively.

COMPARATIVE EXAMPLE 2

The carbon black and the polyethylene the same as those of Example 1 were weighed in the weight ratio of 68:32. After the pulverized carbon black was mixed with a one-tenth amount of the polyethylene and thermally treated for one hour at 190° C. in a rotary kiln having a nitrogen atmosphere, the mixing with the polyethylene, the thermal treatment in the rotary kiln and the pulverization were repeated nine times employing every one-tenth amount of the remaining nine-tenth amount of the polyethylene. The thus obtained particles were thermally treated for five hours at 210° C. in a rotary kiln having a nitrogen atmosphere to prepare the carbon black coated with the polyethylene.

The neutralized surface areas of the initial carbon black, of the carbon black at the time of carrying the polyethylene (before the thermal treatment) and of the carbon black after the thermal treatment were 74 m²/g, 41 m²/g and 37 m²/g, respectively. The decrease rates of the specific surface areas of the carbon black before and after the thermal treatment to that of the initial carbon black were −45% and −50%, respectively.

EXAMPLE 2

The three samples of the carbon black coated with the polyethylene prepared in Example 1 and Comparative Examples 1 and 2 were separately placed in stainless reactors, and a 10% fluorine gas diluted with an argon gas was introduced at a room temperature for 30 minutes for a fluorination reaction of the polyethylene to prepare the carbon black coated with fluorinated polyethylene.

Figure 3A:
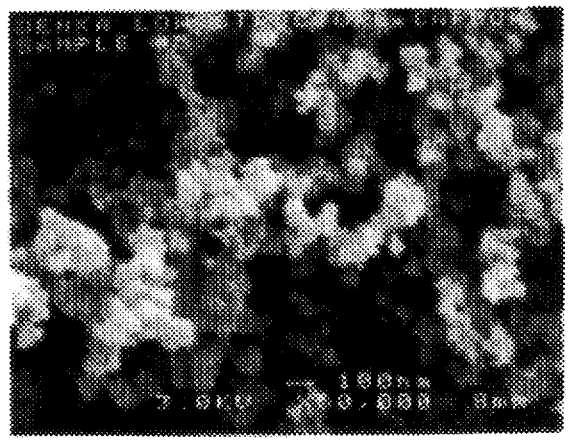
FIG. 3(a) is a microphotograph of 50,000 magnifications of untreated carbon black in Example 3.
Figure 3B:
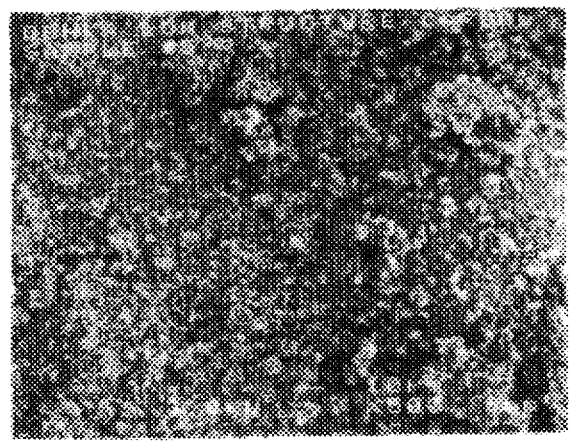
FIG. 3(b) is a microphotograph of 500 magnifications of the same carbon black.
Figure 4A:
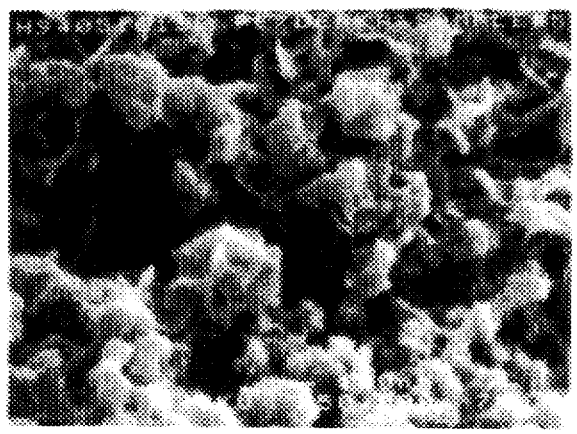
FIG. 4(a) is a microphotograph of 50,000 magnifications of the carbon black particles after the coating of the polyethylene.
Figure 4B:
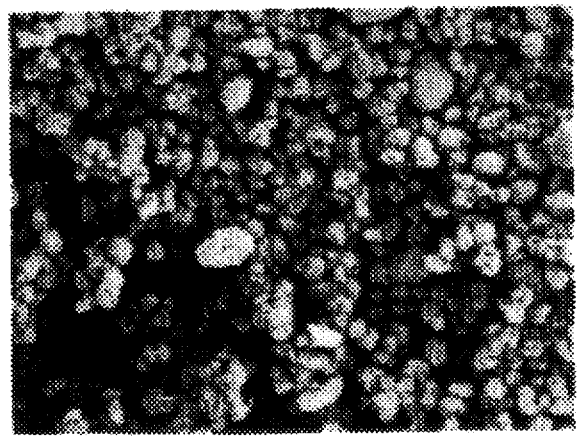
FIG. 4(b) is a microphotograph of 500 magnifications of the same carbon black particles.
Figure 5A:
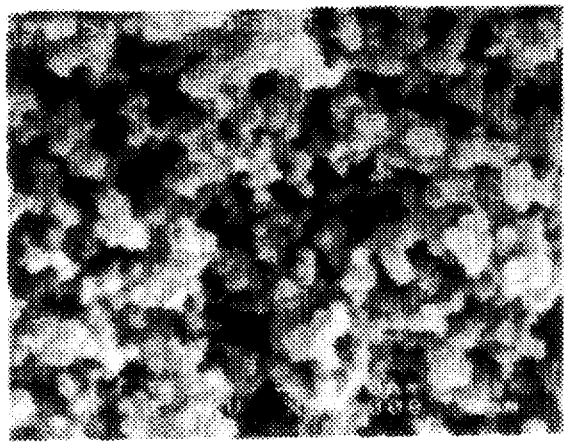
FIG. 5(a) is a microphotograph of 50,000 magnifications of the carbon black particles after the thermal treatment.
Figure 5B:
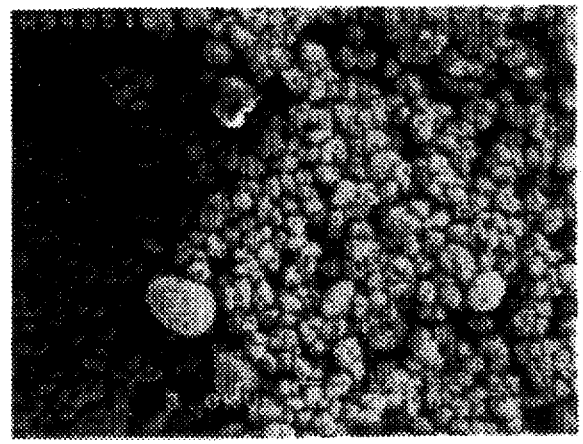
FIG. 5(b) is a microphotograph of 500 magnifications of the same carbon black particles.
Figure 6A:
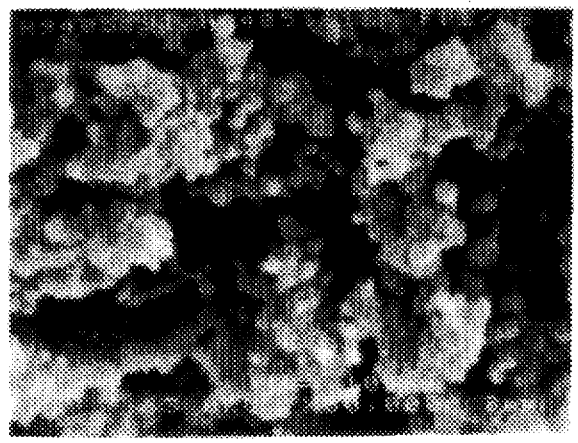
FIG. 6(a) is a microphotograph of 50,000 magnifications of the carbon black particles after the fluorination.
Figure 6B:
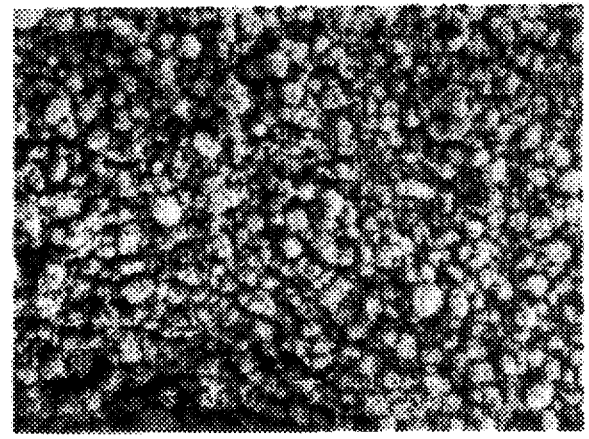
FIG. 6(b) is a microphotograph of 500 magnifications of the same carbon black particles.

Three separate electrodes were prepared employing the respective carbon black of Example 1 and Comparative Examples 1 and 2, and three half cells were assembled employing the respective electrodes and the cell performances were measured. The results are shown in Table 1. It can be observed from Table 1 that the performances of the half cell employing the carbon support prepared in Example 1 were excellent, that is, the preparing steps wherein FIG. 3(a) is a microphotograph of 50,000 magnifications of untreated carbon black, FIG. 3(b) is a microphotograph of 500 magnifications of the same carbon black, FIG. 4(a) is a microphotograph of 50,000 magnifications of the carbon black particles after the coating of the polyethylene, FIG. 4(b) is a microphotograph of 500 magnifications of the same carbon black particles, FIG. 5(a) is a microphotograph of 50,000 magnifications of the carbon black particles after the thermal treatment, FIG. 5(b) is a microphotograph of 500 magnifications of the same carbon black particles, FIG. 6(a) is a microphotograph of 50,000 magnifications of the carbon black particles after the fluorination, and FIG. 6(b) is a microphotograph of 500 magnifications of the same carbon black particles.

What is claimed is:

1. A process for preparing carbon supports which comprises the steps of:
   a) mixing carbon supports, a polyolefin and a solvent;
   b) heating the resultant mixture at a pressure in the range 3.5 to 30 kg/cm² and at a temperature which is higher than the melting point of the polyolefin, but lower than

TABLE 1

| Sample | Tafel Slope AIR −mV/ log (mA/cm²) | Mass Activity O₂ @ mV/mgPt | Poralization Value AIR @ 300 mA/cm mV | Platinum Loading Density mg/cm² mV | Catalyst Utilization (%) | Occupation Rate of Fine Pores (%) |
|---|---|---|---|---|---|---|
| Ex. 1 | 85 | 70 | 770 | 1.0 | 97 | 60 |
| Comp. Ex 1 | 97 | 63 | 750 | 1.0 | 88 | 67 |
| Comp. Ex 2 | 92 | 67 | 760 | 1.0 | 93 | 65 | performance values required in a fuel cell such as a mass activity and catalyst utilization were high.

EXAMPLE 3

Figure 2:
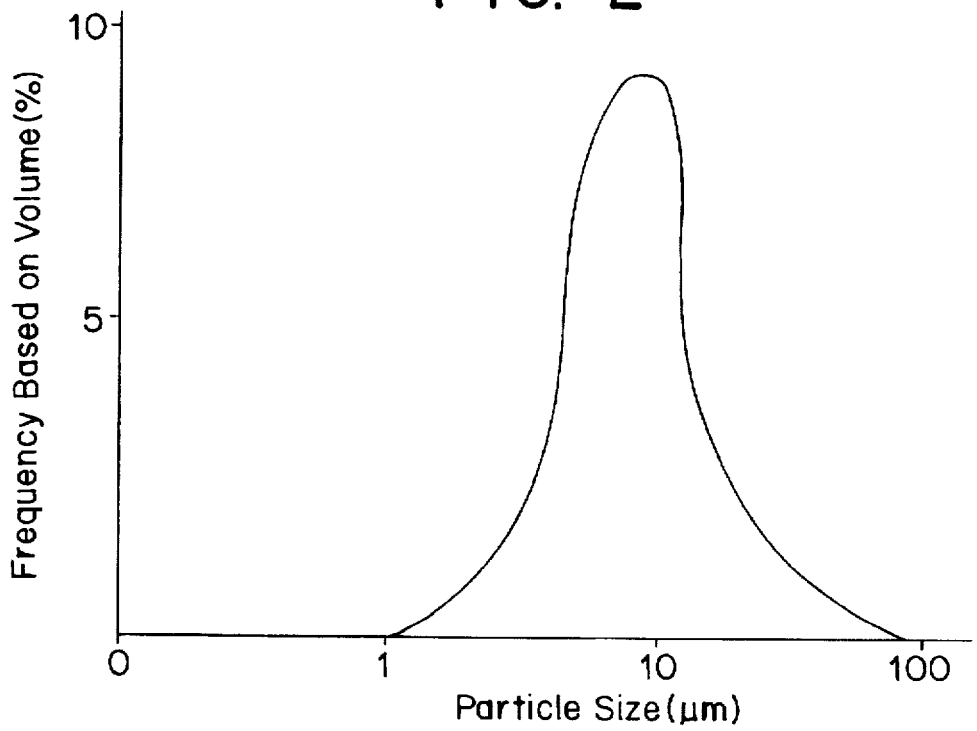
FIG. 2 is a graph showing the particle distribution of the carbon support coated with the polyolefin obtained in Example 3.

The carbon supports coated with the solvated polyethylene were prepared in accordance with the same procedures as those of Example 1 and rapidly cooled by means of water cooling. After n-hexane suspension of the carbon supports coated with polyethylene was placed in a spray inside of which was heated to 100° C. and which had a nozzle inner diameter of 0.7 mm, the suspension was sprayed into an atmosphere at a spray pressure of 1 kg/cm² and a supply rate of 5 g/minute so that the carbon supports coated with polyethylene having a particle size of 7 to 13 μm were obtained. The particle distribution thereof is shown in FIG. 2. The axis of abscissa is a logarithmic scale. It is apparent from the comparison of FIGS. 1 and 2 that while the maximum particle size frequency in FIG. 1 is at about 80 μm, the particle size is coarse and the particle distribution is not uniform, the particle size distribution of the carbon black in FIG. 2 is normal distribution centering about 10 μm and the carbon support has a uniform and fine particle size.

Then, the carbon support particles coated with the polyethylene was fluorinated in an argon gas containing 10% of a fluorine gas to provide the carbon black particles coated with fluorinated polyethylene.

The neutralized surface areas of the initial carbon black, of the carbon black at the time of carrying the polyethylene (before the thermal treatment) and of the carbon black after the spray-drying were 74 m²/g, 34 m²/g and 30 m²/g, respectively. The decrease rates of the specific surface areas of the carbon black before and after the spray-drying to that of the initial carbon black were −54% and −60%, respectively.

FIGS. 3 to 6 are microphotographs showing the surface structure of the carbon black particles in series of the the critical temperature of the solvent to thereby solvate the polyolefin;
   c) cooling the mixture resulting from step b) to thereby load the polyolefin in the form of a uniform layer on the carbon supports; and
   d) fusing the polyolefin.

2. The process of claim 1 wherein the solvent is selected from the group consisting of n-hexane, n-pentane, n-heptane, dioxane and chloroform.

3. The process of claim 1, wherein the polyolefin is polyethylene and the heating is conducted at a temperature in the range of 110° to 235° C.

4. A process for preparing carbon supports which comprises the steps of:
   a) mixing carbon supports, a polyolefin and a solvent;
   b) heating the resultant mixture at a pressure in the range 3.5 to 30 kg/cm² and at a temperature which is higher than the melting point of the polyolefin, but lower than the critical temperature of the solvent to thereby solvate the polyolefin;
   c) cooling the mixture resulting from step b) to thereby load the polyolefin in the form of a uniform layer on the carbon supports;
   d) fusing the polyolefin; and
   e) fluorinating the carbon supports containing the fused polyolefin in a fluorine gas atmosphere to thereby convert the polyolefin into a fluorinated polyolefin.

5. The process of claim 1, wherein the polyolefin is polyethylene and the heating is conducted at a temperature in the range of 110° to 235° C.

6. A process for preparing carbon supports which comprises the steps of:
   a) mixing carbon supports, a polyolefin and a solvent;
   b) heating the resultant mixture at a pressure in the range 3.5 to 30 kg/cm² and at a temperature which is higher than the melting point of the polyolefin, but lower than the critical temperature of the solvent to thereby solvate the polyolefin;

c) cooling the mixture resulting from step b) to thereby load the polyolefin in the form of a uniform layer on the carbon supports;

d) fusing the polyolefin;

e) subjecting the carbon supports containing the fused polyolefin to a fluorine gas atmosphere to thereby convert the polyolefin into a fluorinated polyolefin; and f) employing the carbon supports resulting from step e) as a constituent of a catalyst layer and/or a gas diffusion layer in a gas diffusion electrode.

7. The process of claim 6, wherein the polyolefin is polyethylene and the heating is conducted at a temperature in the range of 110° to 235° C.

8. A process for preparing carbon supports which comprises the steps of:

a) mixing carbon supports, a polyolefin and a solvent;

b) heating the resultant mixture at a pressure in the range 3.5 to 30 kg/cm² and at a temperature which is higher than the melting point of the polyolefin, but lower than the critical temperature of the solvent to thereby solvate the polyolefin;

c) cooling the mixture resulting from step b); and d) removing the solvent from the cooled mixture resulting from step c) by means of spray-drying to thereby form a uniform layer of the polyolefin on the carbon supports.

9. The process of claim 8 wherein the particle size of the carbon supports is between 0.1 and 100 μm, the temperature employed in the spray-drying is between 60° and 160° C., the pressure employed in the spray-drying is between 0.5 and 1.5 kg/cm² and the boiling point of the solvent is not higher than 160° C.

10. The process of claim 9 wherein the solvent is selected from the group consisting of n-hexane, n-pentane, n-heptane, dioxane and chloroform.

11. The process of claim 8, wherein the polyolefin is polyethylene and the heating is conducted at a temperature in the range of 110° to 235° C.

12. A process for preparing carbon supports which comprises the steps of:

a) mixing carbon supports, a polyolefin and a solvent;

b) heating the resultant mixture at a pressure in the range 3.5 to 30 kg/cm² and at a temperature which is higher than the melting point of the polyolefin, but lower than the critical temperature of the solvent to thereby solvate the polyolefin;

c) cooling the mixture resulting from step b);

d) removing the solvent from the cooled mixture resulting from step c) by means of spray-drying to thereby form a uniform layer of the polyolefin on the carbon supports; and e) subjecting the carbon supports resulting from step d) to a fluorine gas atmosphere to thereby convert the polyolefin to a fluorinated polyolefin.

13. The process of claim 12, wherein the polyolefin is polyethylene and the heating is conducted at a temperature in the range of 110° to 235° C.

14. A process for preparing carbon supports which comprises the steps of:

a) mixing carbon supports, a polyolefin and a solvent;

b) heating the resultant mixture at a pressure in the range 3.5 to 30 kg/cm² and at a temperature which is higher than the melting point of the polyolefin, but lower than the critical temperature of the solvent to thereby solvate the polyolefin;

c) cooling the mixture resulting from step b);

d) removing the solvent from the cooled mixture resulting from step c) by means of spray-drying to thereby form a uniform layer of the polyolefin on the carbon supports;

e) subjecting the carbon supports resulting from step d) to a fluorine gas atmosphere to thereby convert the polyolefin to a fluorinated polyolefin; and f) employing the carbon supports resulting from step e) as a constituent of a catalyst layer and/or a gas diffusion layer in a gas diffusion electrode.

15. The process of claim 14, wherein the polyolefin is polyethylene and the heating is conducted at a temperature in the range of 110° to 235° C.

* * * * *

UNITED STATES PATENT AND TRADEMARK OFFICE
CERTIFICATE OF CORRECTION

PATENT NO.  : 5,776,539
DATED       : July 7, 1998
INVENTOR(S) : M. Watanabe et al.

It is certified that error appears in the above-indentified patent and that said Letters Patent is hereby corrected as shown below:

Column 8, line 60, in line 1 of claim 5, delete "1" and insert -- 4 --.

Signed and Sealed this

Eighth Day of December, 1998

*Attest:*

BRUCE LEHMAN

*Attesting Officer*  *Commissioner of Patents and Trademarks*